United States Patent [19]
Conkle

[11] 3,785,695
[45] Jan. 15, 1974

[54] TAILGATE ASSEMBLY

[75] Inventor: Ellsworth V. Conkle, Paonia, Colo.

[73] Assignees: James A. Stratman, Cedaredge; Fred P. Morgan, Delta, both of Colo.

[22] Filed: Apr. 27, 1972

[21] Appl. No.: 248,081

[52] U.S. Cl.................................. 296/50, 160/188
[51] Int. Cl................................................ B60j 5/12
[58] Field of Search........................ 296/50, 51, 61; 160/188, 217; 119/82, 20; 16/163

[56] References Cited
UNITED STATES PATENTS

| | | | |
|---|---|---|---|
| 2,177,826 | 10/1939 | Hansen | 16/163 |
| 1,346,853 | 7/1920 | Sloane | 16/163 UX |
| 3,687,186 | 8/1972 | Paton | 160/188 |
| 1,739,335 | 12/1929 | Tangeman | 296/61 UX |
| 2,863,696 | 12/1958 | Sigman | 119/82 X |
| 2,872,698 | 2/1959 | Gommels | 16/163 |
| 3,456,977 | 7/1969 | Dugan | 296/51 |

*Primary Examiner*—David Schonberg
*Assistant Examiner*—John A. Pekar
*Attorney*—Clarence A. O'Brien and Harvey B. Jacobson

[57] ABSTRACT

A tailgate assembly for use with rear-loading vehicles, said assembly comprising a pair of doors hingedly connected to a pair of support frames, each support frame being pivotally mounted to one of the carrying compartment side walls to permit composite transverse, pivotal movement of the doors by pivoting the support frames to achieve the desired door opening width for the convenient loading at a ramp, livestock chute, or the like.

7 Claims, 7 Drawing Figures

PATENTED JAN 15 1974 3,785,695

TAILGATE ASSEMBLY

The present invention is generally related to vehicle tailgate assemblies and, more particularly, to an improved adjustable tailgate assembly for use with pickup trucks and the like to aid in the loading and unloading of livestock.

In the past, various tailgate assemblies have been proposed for use with pickup trucks and other load carrying vehicles. It has been found that such conventional constructions in many cases have not been convenient to use in the process of loading and unloading livestock via a typical livestock chute arrangement. The problem arises that the conventional tailgates do not provide an opening the same width as the livestock chute, thereby leaving a gap through which the livestock may escape if not attended to. While a pair of hinged back doors provide a basic means for adjusting the width of the rear opening, such an arrangement does not permit the truck to back up flush with the livestock chute or ramp, thereby making it necessary to provide a ramp extension to the load compartment.

Therefore, it is an object of the present invention to provide a unique tailgate assembly which is adapted to be mounted to a pickup truck or the like to provide a rear opening of adjustable width and which permits the truck to back up flush with a loading ramp or livestock chute, thereby eliminating the need for a ramp extension, or attention to prevent the escape of livestock.

Another object of the present invention is to provide a novel adjustable tailgate assembly comprising a pair of loading doors hingedly mounted to a pair of support frames which are pivotally connected to the load compartment side walls, whereby the spacing between the doors may be selectively adjusted by a composite sliding and pivotal movement of the doors by way of the support frames.

It is a further object of the present invention to provide a versatile adjustable tailgate assembly including rear doors which may be adjusted to any one of several positions for loading, or complete closure or which may be swung out of the way to a position overlying the side walls when not in use.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1:
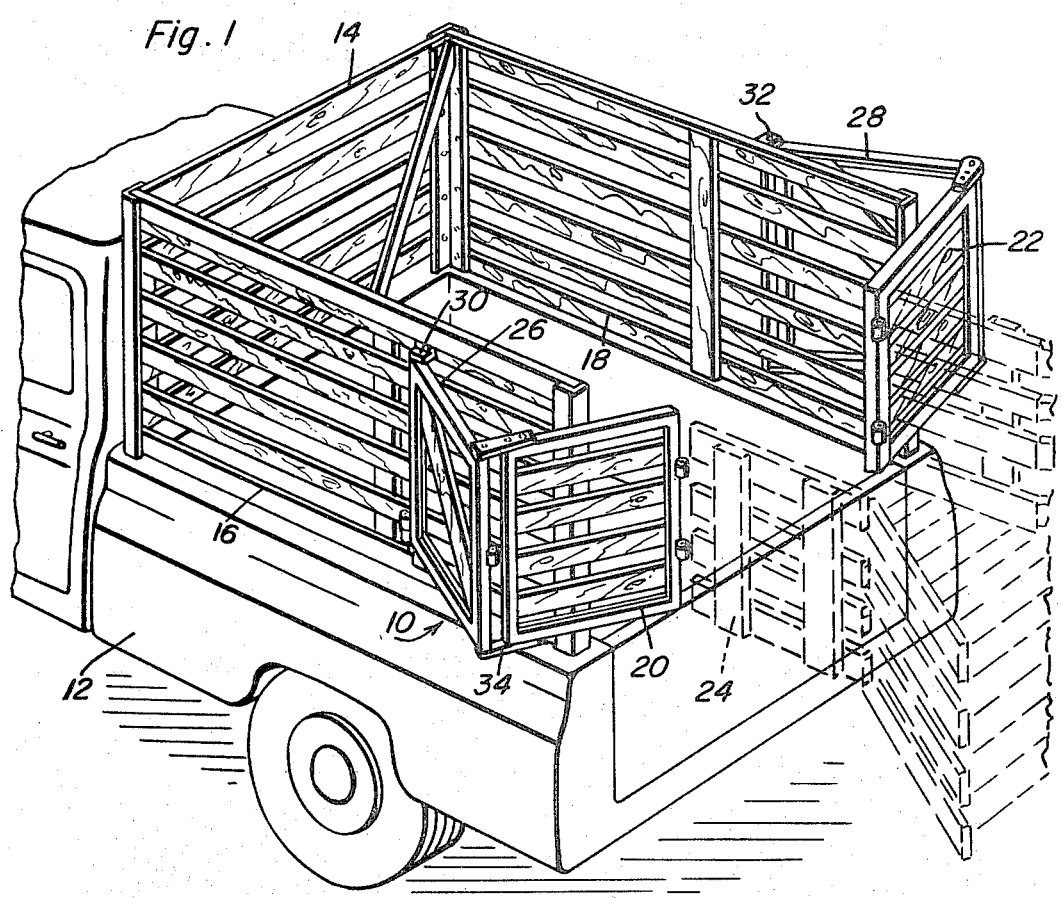
FIG. 1 is a perspective view of the tailgate assembly of the present invention mounted to a typical pickup truck with a livestock chute shown in phantom.
Figure 2:
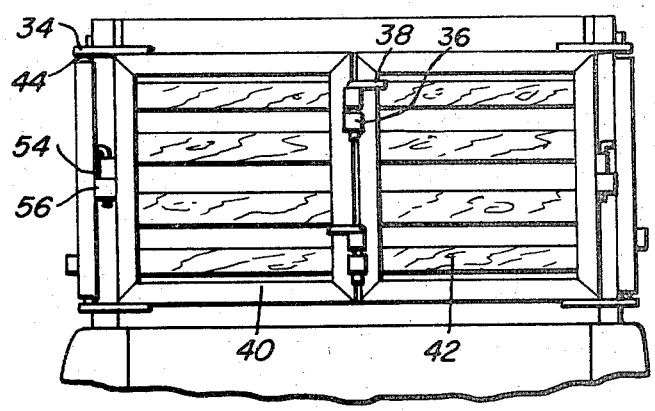
FIG. 2 is a back elevational view of the tailgate assembly shown in FIG. 1, but in a fully closed position.

Referring now, more particularly, to FIG. 1 of the drawings, the tailgate assembly of the present invention is generally indicated by the numeral 10 and is illustrated as being mounted to a typical pickup truck 12 being provided with a stock rack including a front wall 14 and a pair of oppositely disposed side walls 16 and 18.

The assembly includes a pair of rear doors 20 and 22 which are selectively adjustable to provide an access opening of desired width. The unique mounting of the doors permits a composite pivotal and transverse sliding movement to adjust the door opening with the pickup truck backed up flush against a loading ramp or livestock chute, such as that indicated in phantom at 24. This adjustable movement of the rear doors is provided by way of a pair of support frames 26 and 28, each of which is pivotally mounted to the side walls as indicated at 30 and 32. Each of the support frames is generally rectangular in configuration with the pivotal mounting being located along a front edge portion. The back edge portion of each support frame extends slightly beyond the back end of the associated side wall and is provided with a pair of hinged brackets 34 which provide a pivotal mounting for the associated rear door. The closure edge of each rear door is provided with a pair of sleeves 36 which are adapted to align with each other when the doors are fully closed and receive a fastening pin, such as that indicated at 38 to lock the doors in position. Preferably, each door is provided with a rectangular angle iron framework 40 with a plurality of wooden slats 42 mounted thereto in a conventional manner. The outer corner portions of each door are welded to the hinged bracket 34 which, in turn, are pivotally connected to the associated support frame as indicated at 44. It will be appreciated that the pivot points 44 are offset slightly from the transverse axes of the associated door. This permits folding the doors back when not in use, as hereinafter explained.

Figure 3:
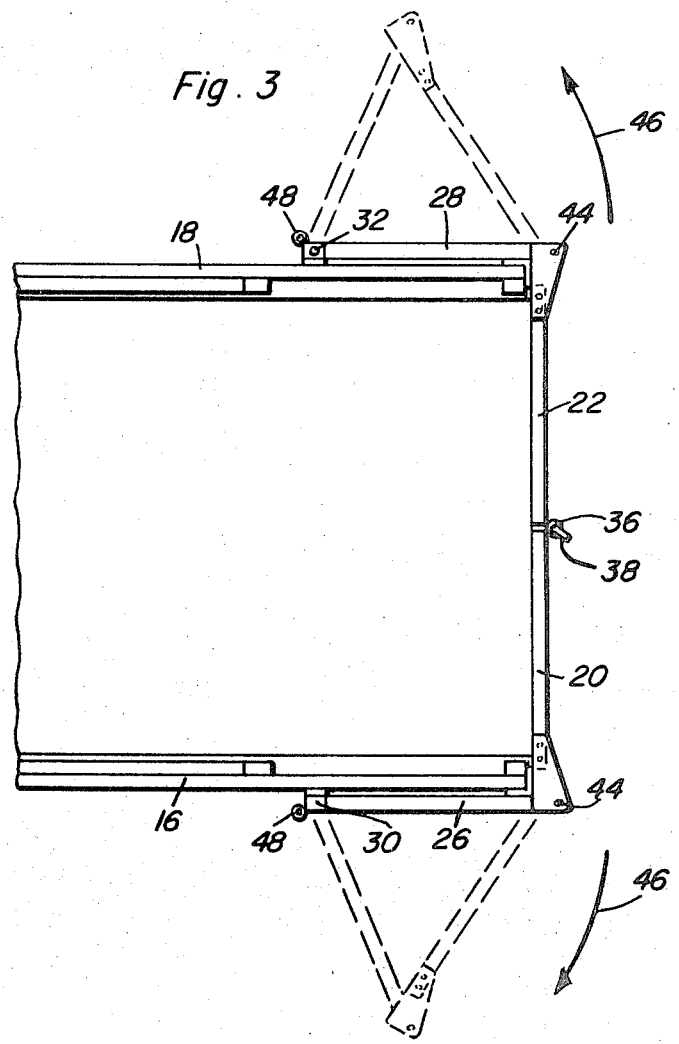
FIG. 3 is a partial plan view of the tailgate assembly shown in FIG. 2 with alternate door positions shown in phantom.

The opening or spacing between the rear doors may be selectively adjusted by pivoting the associated support frames about their pivotal mountings 30 and 32. This imparts transverse movement to the doors with slight pivotal action as shown in phantom in FIG. 3 and indicated by the arrows 46. Since each door is pivotally connected to the associated support frame, it is possible to maintain the doors in engagement with the rear edges of the associated side walls, or if desired to swing the doors slightly backward for engagement with a ramp or livestock chute. Thus, the door may be positioned to properly meet with the livestock chute to provide a continuous fence or corral which prevents escape of the livestock during loading or unloading procedures. Furthermore, since the truck may retain flush with the ramp it is not necessary to provide a ramp extension into the loading compartment.

Figure 5:
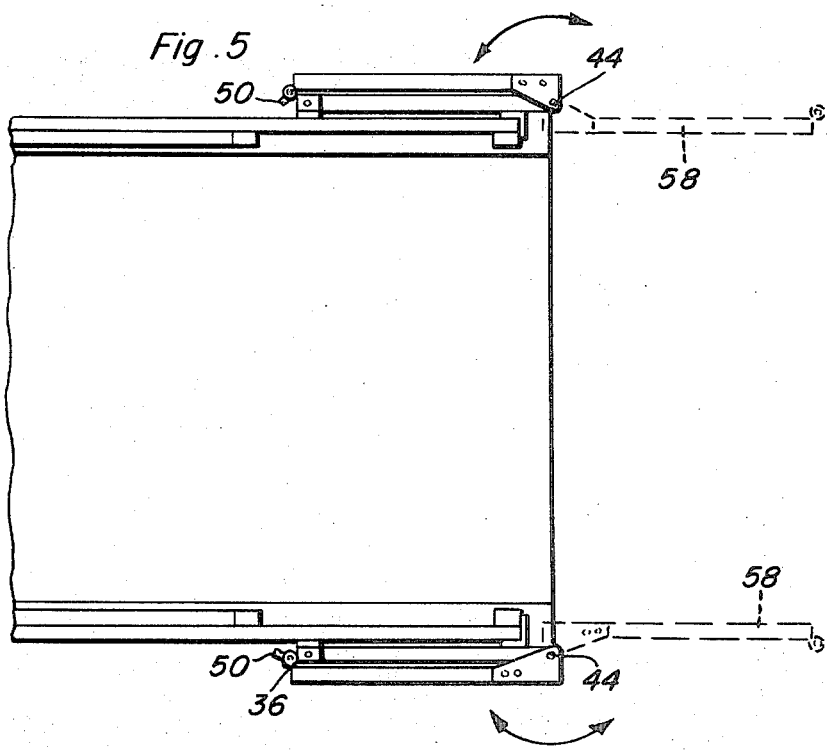
FIG. 5 is a partial plan view of the tailgate assembly shown in FIG. 3 with the doors folded back and with a phantom view of the doors in a fully extended position.
Figure 6:
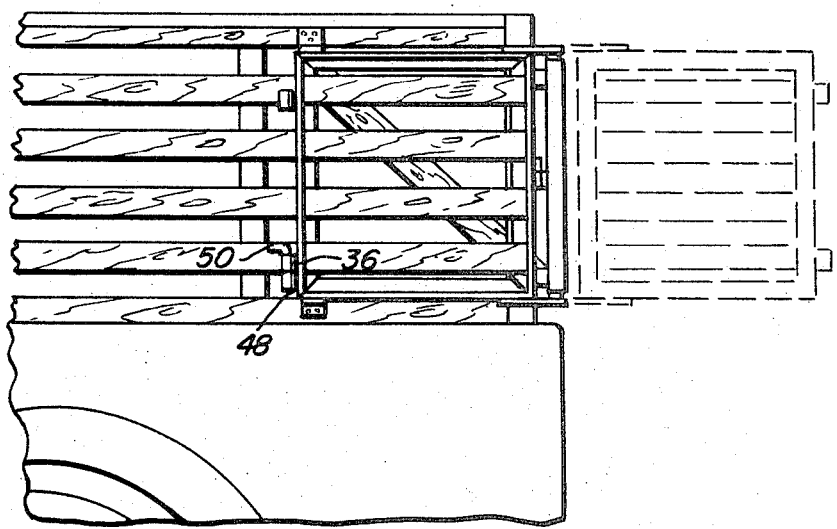
FIG. 6 is a side elevational view of the tailgate assembly shown in FIG. 5.

Referring to FIGS. 5 and 6, it will be appreciated that the adjustable tailgate assembly of the present invention may be positioned for functions other than the loading of livestock or the like. When the vehicle is being utilized for functions other than the transportation of livestock, it may be desirable to position the doors out of the way to provide unhampered access to the vehicle carrying compartment. The front edge of each support frame is provided with a collar or sleeve 48 adapted to receive a locking pin 50 which also extends through a fastening collar 36 mounted to the closure edge of each door. Thus, the doors may be fastened firmly in a folded position overlying the support frames when closure of the doors is not required. It will also be appreciated that the rear edge portion of each support frame may be fastened to the associated side wall by way of a similar pin and sleeve connection as indicated at 52, with one sleeve 54 being welded to the side wall and the other sleeve 56 being welded to the support frame. With the support frames held firmly in position by the pin and sleeve connections at 52, the doors may be adjustably pivoted to any desired position such as that indicated in phantom at 58.

Figure 7:
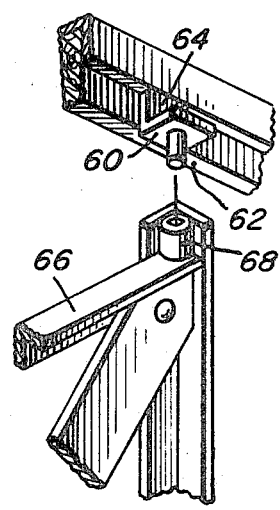
FIG. 7 is an exploded partial perspective view of the pivotal mounting of the support frames associated with the present invention.
Figure 4:
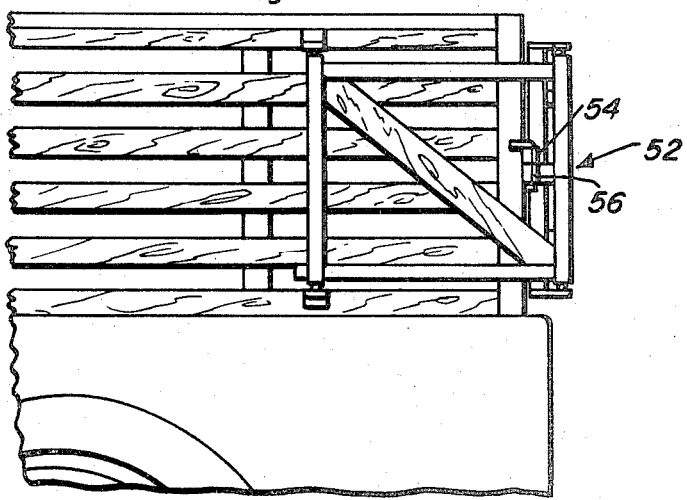
FIG. 4 is a side elevational view of the tailgate assembly as shown in FIG. 3.

Referring to FIG. 7, the pivotal mounting for the tailgate assembly of the present invention may be seen in more detail. Preferably a mounting bracket 60 including an integral pivot pin 62 is fastened to the associated side wall by screws 64, welding or other fastening means. Each of the support frames is provided with an upper angle iron 66 with a mounting sleeve 68 affixed to one end thereof and adapted to slide over pivot pin 62. Each support frame is provided with a pair of these pivotal mountings which may be conveniently installed to an existing livestock rack or similar side wall construction associated with load carrying vehicles.

From the foregoing description it will be appreciated that the adjustable tailgate assembly of the present invention includes a relatively small number of moving parts, yet, provides an infinite number of rear door positions permitting adjustable engagement with livestock chutes and the like with the vehicle back flush therewith. Furthermore, the addition of the support frame fastening collars provides a means of securing the rear doors in a folded position overlying the associated support frame or to provide purely a pivotal adjustment of the doors, if desired. It will also be appreciated that the tailgate assembly is relatively easy to install in a minimum amount of time and economical to manufacture.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a vehicle having oppositely disposed load carrying compartment side walls terminating at a rear loading opening, an adjustable tailgate assembly for varying the effective width of the rear loading opening, said assembly comprising a pair of relatively rigid vertical support frames each having front and rear end portions and each being pivotally connected to one of the side walls at its front end portion such that its rear end portion is immediately adjacent to the rear loading opening when the support frame is positioned in close overlapping relation to the side wall, and a pair of doors each pivotally connected at one transverse end to the rear end portion of one of said support frames, the opposite transverse end of each door defining a closure edge, said doors being selectively positionable between a position fully closing said loading opening and a position fully opening said loading opening by a pivotal movement of said support frames and a generally transverse movement of said doors to provide an adjustable access opening defined by said closure edges.

2. The structure of claim 1 including latch means engageable with the closure edges of said pair of doors for selectively maintaining said doors in the fully closed position, and additional latch means at the front end portions of said support frames for engagement with the closure edges of said doors upon a pivotal outward swinging of said doors into overlying relation with their associated support frames.

3. In a vehicle having oppositely disposed load carrying compartment side walls terminating at a rear loading opening, a tailgate assembly comprising a pair of relatively rigid support frames each having front and rear end portions and each being pivotally connected to one of the side walls at its front end portion such that its rear end portion is immediately adjacent to the rear loading opening when the support frame is positioned in close overlapping relation to the side wall, and a pair of doors each pivotally connected at one transverse end to the rear end portion of one of said support frames, the opposite transverse end of each door defining a closure edge, said doors being selectively positionable between fully closed and fully open positions at the loading opening by pivotal movement of said support frames to provide an adjustable access opening defined by said closure edges, said pair of doors being provided with first and second latch members respectively mounted at their closure edges to selectively maintain the doors in the fully closed position, said pair of support frames being provided with third and fourth latch members respectively mounted at their front end portions and adapted to coact with said first and second latch members to maintain said doors in a folded position with each closure edge overlapping the front edge portion of the associated support frame.

4. The structure set forth in claim 3 wherein each of said support frames includes means for selectively latching it to the associated side wall to prevent rotation therebetween.

5. The structure set forth in claim 3 wherein the width of each of said doors is approximately equal to the width of the associated support frame and the composite width of both of said doors is at least as great as the width of said loading opening.

6. A tailgate assembly for use with vehicles having oppositely disposed load carrying compartment side walls terminating at a rear loading opening, said assembly comprising a pair of support frames each having front and rear ends and adapted to be pivotally mounted at the front end to one of the carrying compartment side walls for pivotal movement of the pair of support frames about substantially vertical axes such that the rear ends extend slightly beyond the rear loading opening when the support frames are parallel with the associated side walls, a pair of doors adapted to form a closure at the loading opening, each of said doors including a mounting edge portion pivotally fastened to the rear end of one of said support frames and an opposite closure edge portion, and means on the closure edge portions for fastening said doors in a closed position, each of said doors being substantially perpendicular to the associated support frame when the doors are in the closed position, each of said support frames including means for selectively latching it to the associated side wall to prevent rotation therebetween while allowing rotation between each door and its associated support frame, each of said support frames including means for selectively fastening the associated door in overlapping parallel position, whereby the rear loading opening is unobstructed by said doors.

7. The structure set forth in claim 6 wherein the means for selectively fastening the associated door in overlapping parallel position to its support frame is mounted at the front end of the frame, each door being of approximately equal width with its associated support frame.

* * * * *